United States Patent [19]

Farr

[11] Patent Number: 4,941,713
[45] Date of Patent: Jul. 17, 1990

[54] HYDRAULIC ANTI-LOCK BRAKING SYSTEMS FOR VEHICLES

[75] Inventor: Glyn P. R. Farr, Warwickshire, England

[73] Assignee: Lucas Industries, Birmingham, England

[21] Appl. No.: 348,205

[22] Filed: May 5, 1989

[30] Foreign Application Priority Data

May 10, 1988 [GB] United Kingdom ............ 8811013

[51] Int. Cl.$^5$ ............................................. B60T 8/40
[52] U.S. Cl. .................................... 303/116; 303/110
[58] Field of Search ............... 303/110, 111, 114, 115, 303/116, 119

[56] References Cited

U.S. PATENT DOCUMENTS

| | | | |
|---|---|---|---|
| 3,756,666 | 9/1973 | Leiber | 303/116 X |
| 4,033,638 | 7/1977 | Bertone et al. | 303/116 |
| 4,316,642 | 2/1982 | Belart | 303/116 |
| 4,340,258 | 7/1982 | Farr | 303/116 X |
| 4,401,348 | 8/1983 | Farr | 303/116 |

Primary Examiner—Duane A. Reger
Attorney, Agent, or Firm—Laff, Whitesel, Conte & Saret

[57] ABSTRACT

Fluid is adapted to be released from a brake to an expansion chamber from which a pump is adapted to withdraw fluid to achieve automatic re-application to the brake. The system includes an inlet valve between a master cylinder and the brake, a re-application valve between the pump and the brake, and a dump valve between the brake and the expansion chamber. The three valves are solenoid-operated and are operable in a predetermined sequence by a control module responsive to signals from means responsive to the behaviour of a wheel braked by the brake. Brake re-application pressure may be held in a "hold" mode by closing the re-application valve to prevent the pump from increasing the pressure within the brake. In a modification a separate, additional, hold valve may be provided to isolate the expansion chamber from the brake.

12 Claims, 8 Drawing Sheets

HYDRAULIC ANTI-LOCK BRAKING SYSTEMS FOR VEHICLES

This invention relates to hydraulic anti-lock braking systems for vehicles of the kind in which the supply of hydraulic fluid from a supply, suitably a master cylinder, to a brake on a wheel is modulated in an anti-lock mode in accordance with the behaviour of the braked wheel, and a pump is adapted to generate the energy necessary to re-apply the brake automatically after the pressure applied to the brake has first been released to prevent the wheel from locking.

In one known hydraulic anti-lock braking system of the kind set forth, for example as disclosed in EP-A-No. 0 202 845, in an anti-lock mode a first control valve is adapted to isolate the master cylinder from the brake, and a second control valve is adapted to release fluid from the brake to an expansion chamber. In such a system the pump, which is driven by an electric motor, is adapted to return fluid from the expansion chamber to the master cylinder, and the first valve is also used to control the rate at which the brake is re-applied.

Braking systems of the type such as EP-A-No. 0 202 845 usually have two pump pistons, each adapted to return fluid from an expansion chamber to a respective circuit comprising at least one brake and a respective pressure space of the master cylinder.

Such braking systems become complicated, when considering multi-channel systems, because one pump is required for each brake line. However, such systems are advantageous over systems in which fluid is pumped back to the master cylinder in that they offer improved pedal feel, an electric motor for operating each pump can be relatively smaller, noise is reduced, and there is no adverse effect upon the master cylinder.

When one pump is provided for more than one brake in a respective circuit, such as a front wheel brake and a brake on the diagonally opposite rear wheel, the re-application pressure can rise only to the level of the lower brake pressure. On a split $\mu$ surface this would lead to severe under braking of a non-controlled wheel.

According to our invention, in an hydraulic anti-lock braking system of the kind set forth for vehicles, fluid is adapted to be released from a brake to an expansion chamber from which the pump is adapted to withdraw fluid to achieve automatic re-application of the brake under the control of a valve assembly, the valve assembly comprising a inlet valve for controlling communication between the master cylinder and the brake, a re-application valve for controlling communication between the output from the pump and the brake, and a dump valve for controlling communication between the brake and the expansion chamber, the valves being operable in a predetermined sequence by a control module responsive to signals from means responsive to the behaviour of the braked wheel.

For normal operation the inlet valve and the re-application valve are both open, and the dump valve is closed. In an anti-lock mode the inlet valve and the re-application valve both close and the dump valve opens. The master cylinder is therefore isolated from the brake, from which fluid is dumped to the expansion chamber through the open dump valve and from which fluid can be withdrawn by the pump. Whilst the re-application valve remains closed, fluid is pumped back to the master cylinder. However, as soon as the wheel recovers its road speed, the dump valve closes, and the re-application valve opens so that fluid is pumped back to the brake to effect brake re-application, but with the inlet valve remaining closed.

The pump is preferably driven by a motor operated in sequence with operation of the valve assembly and the output from the pump is matched by a pre-determined re-apply rate for a front wheel brake. This permits a smaller and cheaper motor to be used in comparison with a motor required to power a pump of the type which continually returns fluid to the master cylinder since such a pump has to work at all times against the relatively higher output pressure from the master cylinder.

Pumping most of the fluid back to the brake gives a good pedal feel and does not have an adverse effect upon the seals of the master cylinder and by pumping fluid back to the brake, which acts as a stiff accumulator, noise and hydraulic shock are reduced substantially.

The re-application valve and the dump valve may be separate from each other, each comprising a valve member for co-operation with a respective valve seat. In a modification, however, the re-application valve and the dump valve are combined into a single re-application and dump valve assembly comprising a double-acting valve member engageable alternately with spaced valve seatings.

When the re-application valve is separate from the dump valve it may be operated during or before the re-application mode to provide a "hold" feature. This is achieved by closing the re-application valve to prevent the pump from increasing the pressure within the brake.

When a combined re-application and dump valve assembly is provided, a hold valve may be incorporated to isolate the pump from the expansion chamber, thereby preventing the pressure applied to the brakes from being increased.

Modulator means comprising the control valve assembly, expansion chamber and a single pump plunger are connected between a pressure space of the master cylinder and a front wheel brake, so that two similar means are provided for modulating the supply of fluid to both front wheel brakes of a vehicle.

Thus one pump per channel is provided.

Each rear wheel brake can be controlled in sequence with, or independently of the corresponding front wheel brake, preferably brakes on diagonally opposite wheels.

When a rear wheel brake is controlled in sequence with a front wheel brake, the rear wheel brake is connected to the front wheel brake through an apportioning valve so arranged that the front wheel will lock before the rear.

When the rear wheel brake is operated independently of the front wheel brake fourth and fifth oppositely operable valves are provided to control communication between the pump and the rear brake, and between the rear brake and the expansion chamber.

Normally the fourth valve is open so the fluid is supplied to the brake from the master cylinder through the open inlet and re-application valves, and the fifth valve is closed.

When the front wheel is subjected to an anti-lock mode, closure of the re-application valve prevents further increase in the pressure supplied to the rear brake until the inlet valve opens and the pressure applied to the rear brake is increased progressively with each correction of the front brake until either the applied pressure is attained, or the rear wheel locks.

When the rear wheel locks, the fifth valve opens to relieve the pressure to the expander chamber, and the fourth valve closes. When the wheel recovers, the fifth valve is closed and the fourth valve is opened or is cycled to re-admit to the rear brake the pressure level within the front brake.

Each valve is preferably of the solenoid-operated type, and the coil of each valve is adapted to be energised by an energising current emitted by the control module in response to signals from a respective wheel speed sensor.

Some embodiments of our invention are illustrated in the accompanying drawings in which.

Figure 1:
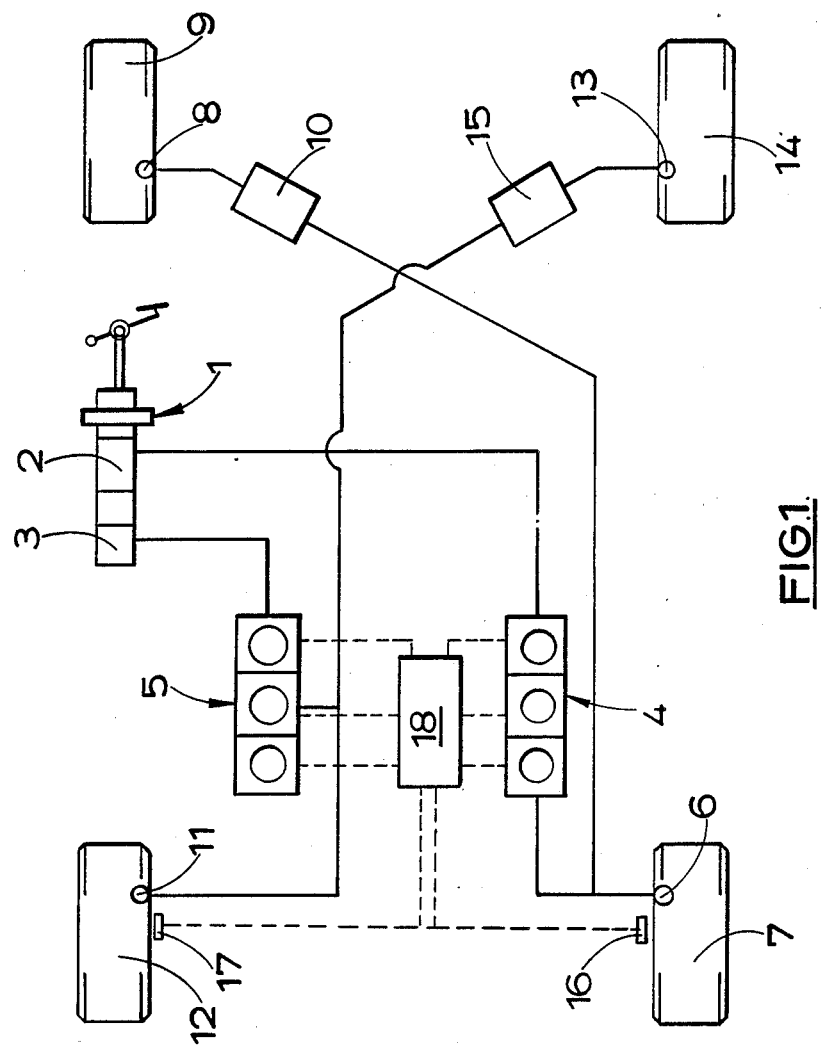
FIG. 1 is a layout of an hydraulic anti-lock braking of the two channel type including two modulators.
Figure 2:
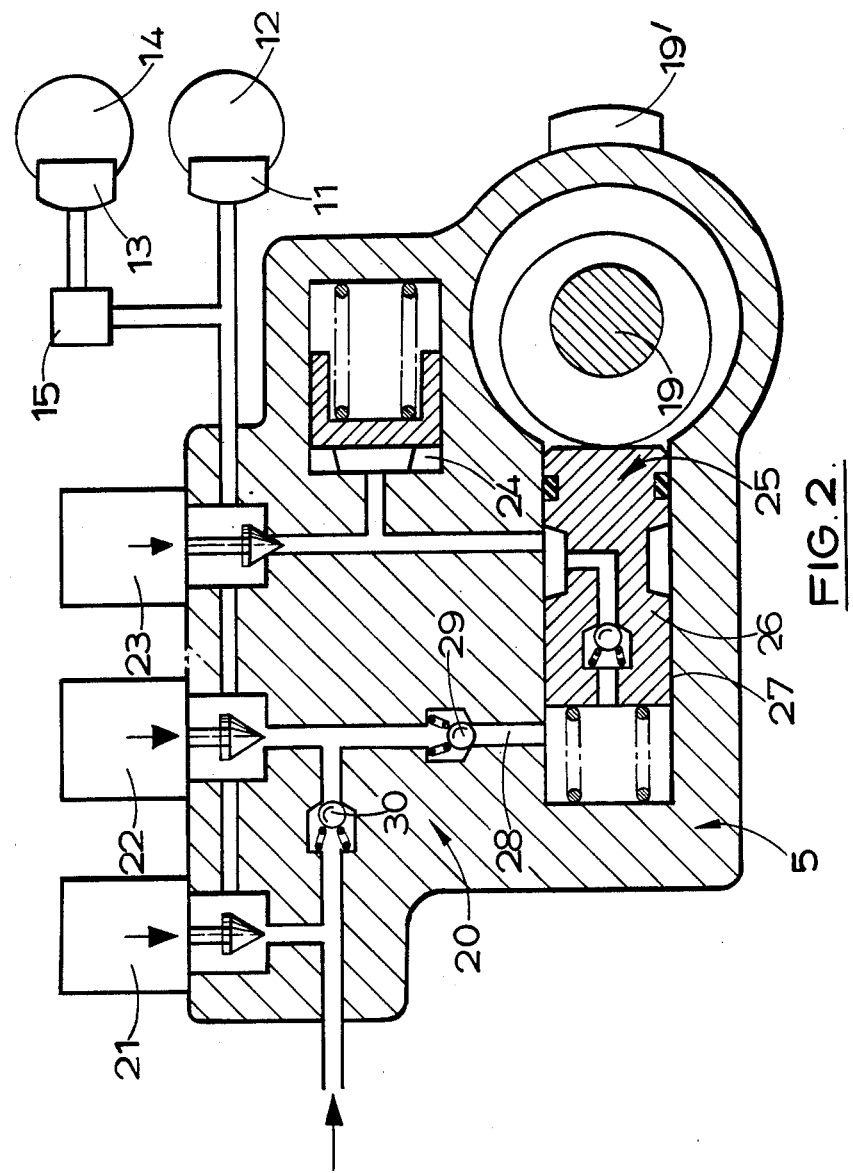
FIG. 2 is a longitudinal section through one of the two modulators of FIG. 1.

The anti-lock braking system illustrated in FIGS. 1 and 2 of the accompanying drawings comprises a pedal-operated master cylinder 1 having primarly and secondary pressure spaces 2,3, each connected to a respective modulator assembly 4,5. The modulator assembly 4 modulates the supply of fluid from the master cylinder 1 directly to a brake 6 on one front wheel 7 of the vehicle, and indirectly to a brake 8 on a diagonally opposite rear wheel 9 of the vehicle through an apportioning valve 10. Similarly the modulator assembly 5 modulates the supply of fluid from the master cylinder 1 directly to a brake 11 on the other front wheel 12 of the vehicle, and indirectly to a brake 13 on the other diagonally opposite rear wheel 14 through an apportioning valve 15.

The speed of the front wheel 7 is sensed by a speed sensor 16, and that of the front wheel 12 by a speed sensor 17. Signals from each sensor 16, 17 are fed into a control module 18 which emits electrical currents to control operation of the respective modulator assembly 4 or 5.

The modulator assemblies 4, 5 are both similar in construction. The modulator assembly 5 is illustrated in FIG. 2 and will be described in detail. As illustrated the modulator assembly 5 comprises a housing 20 incorporating a solenoid-operated inlet valve 21, a solenoid-operated re-application valve 22, a solenoid-operated dump valve 23, an expansion chamber 24, and an hydraulic pump 25 for providing the energy to re-apply the brakes 11, 13 during an anti-lock mode.

The pump 25 comprises a single piston 26 which is reciprocable in a bore 27 in response to operation of a drive mechanism 19 operated by an electric motor 19' to draw fluid from the expansion chamber 24 and pump it to a radial passage 28 leading from the bore 27. The passage 28 leads back to the re-application valve 22 through a one-way valve 29, and back to the master cylinder through a one-way valve 30 located in a return line 31 between the one-way valve 29 and the re-application valve 22.

In a normal brake applying position the pump 25 is inoperative. The dump valve 23 is closed to isolate the brakes 11, 13 from the expansion chamber 24, and both valves 21 and 22 are open. In a modification the valve 22 may be closed. Fluid from the master cylinder 1 is supplied to the brakes 11,13 through the open valve 21. This fluid also flows through the valve 22, when open, to act on the one-way valve 29 in a closing direction.

If the speed sensor 17 emits an anti-lock signal the control module 18, in turn, emits an energising current which causes the valves 21 and 22 to close, the valve 23 to open, and operates the electric motor 19' to drive the pump 25. Closure of the valve 21 isolates the master cylinder 1 from the brakes 11, 13 and opening the valve 23 connects the brakes 11, 13 to the expansion chamber 24. The pump 25 draws fluid from the expansion chamber 24 and pumps it to the master cylinder 1. This continues for as long as the valve 22 remains closed.

At the point at which the reduction in brake pressure permits wheel recovery, the control module 18 is operative to cause the valve 23 to close and the valve 22 to open. After this action the pump 25 returns fluid to the brakes 11, 13 without adverse reaction at the foot pedal.

Because a small portion of fluid had already been returned to the master cylinder 1, the level of pressure regained by the action of the pump 25 will be less than that which had caused the previously corrected anti-lock condition. After a predetermined time, however, the valve 21 is cycled to admit extra pressure to the brakes in anticipation that road conditions will have improved. The valve 21 continues to be cycled until an anti-lock condition is again sensed whereafter the sequence described above is repeated. If the applied pressure is too low, or has been released, the valve 21 will re-open to re-connect the master cylinder 1 fully to the brakes 11,13. At the same time the motor driving the pump 25 is switched off.

If the vehicle passes from a surface of relatively high friction to a surface of relatively low friction, the valves 21, 22 and 23 act as described above but, after the valve 23 closes at the commencement of the wheel recovery, the valve 22 remains closed to "hold" the brake pressure steady and to ensure that some of the surplus fluid is returned from the expansion chamber back to the master cylinder 1.

The master cylinder 1 is therefore automatically re-positioned to take account of the new road surface conditions and is ready to supply extra fluid if the road surface improves.

When the control module 18 has established that the wheel is fully recovered, the valve 22 is opened to permit brake re-application.

Figure 3:
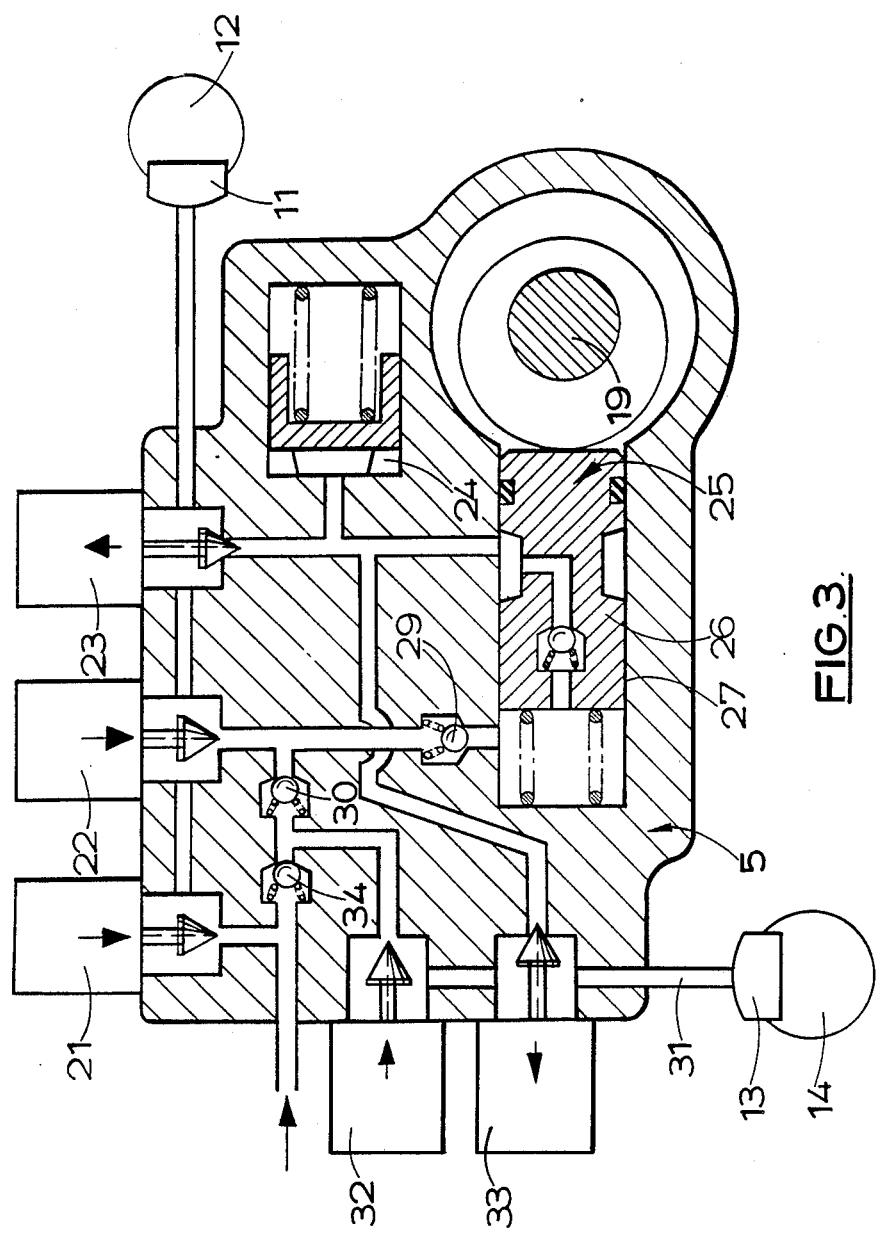
FIG. 3 is a longitudinal section through a modulator similar to the modulator of FIG. 2 but adapted for a braking system of the four channel type.

The modified modulator assembly illustrated in FIG. 3 of the accompanying drawings controls two separate channels. This is achieved by modifying the modulator 5 to provide a separate connection 31 from the modulator to the rear wheel brake 13, and modifying the modulator to include two additional interconnected solenoid-operated valves 32 and 33 which are both responsive to signals from the control modulator 18. The valve 33 controls communication between the expansion chamber 24 and the connection 31, and the valve 32 controls communication between the master cylinder 1 and the brake 13.

A third one-way valve 34 is located between the connection to the valve 32 and the connection from the master cylinder 1 to the valve 21. The valve 34 opens in the same direction as the one-way valve 30.

A speed sensor is fitted to each rear wheel 9, 14.

When the brakes are to be applied normally the valve 32 is open and the valve 33 is closed. The expansion chamber 24 is therefore isolated from the rear brake 13, and the rear brake 13 can be applied by the supply of pressure fluid from the master cylinder 1 through the open valves 21 and 22, the one-way valve 30, and the open valve 31.

The operation of the system incorporating the modulator of FIG. 3 is similar to that described above with reference to FIG. 2.

When the wheel speed sensor 17 associated with the front wheel 12, which tends to be the first to lock, emits an anti-lock signal, the valves 21 and 22 close, the valve 23 opens, and the pump operates 25 to withdraw fluid from the expansion chamber 24 and pump it through the one-way valves 29 and 30 to the rear brake 13. The pressure applied to the rear brake 13 is therefore increased above that at the front wheel brake 11.

When the wheel 12 recovers, the valve 23 closes and the valve 22 opens to permit the re-application of pressure to the front brake 11 is described above with reference to FIG. 2. This pressure, as before, will be less than that which caused the wheel lock since some of the fluid from that front brake 11 had been transferred to increase the pressure of the rear brake 13.

If the front wheel speed sensor 17 does not signal another wheel lock, the solenoid-operated valve 21 is cycled to increase the pressure applied to the front brake 11. If this provokes a further wheel lock, then the pressure applied to the rear brake 13 will again be increased.

The pressure applied to the rear brake 13 is therefore progressively raised with each correction of the pressure applied to the front brake 11 until, either the applied pressure at the master cylinder 1 is attained when surplus fluid is pumped back to the master cylinder 1, or the rear wheel 14 locks. Should the rear wheel 14 lock, then the signal from its speed sensor is recognised by the control modulator 18 which is then operative to cause the valve 32 to close and the valve 33 to open. This isolates the master cylinder 1 from the brake 13, and dumps the fluid in the brake 13 to the expansion chamber 24.

When the rear wheel 14 recovers, the valve 33 closes and the valve 32 opens, as it is cycled to re-admit to the rear brake 13 the pressure level from the front brake 11.

In another sequence the rear brake 13 can go into a "hold" condition to permit the rear wheel to recover by closing both valves 32 and 33.

If the vehicle passes onto a surface of relatively low $\mu$ the pressures applied to both the front brake 11 and to the rear brake 13 need to be reduced. The control module 18 is then operative to close the valves 21, 22 and 32, and open the valves 23 and 33. In this condition, since the valves 22 and 32 are closed, the pump 25 will force fluid back into the master cylinder 1 to correct the position of the master cylinder 1 and remove surplus fluid from the expansion chamber 24.

Figure 4:
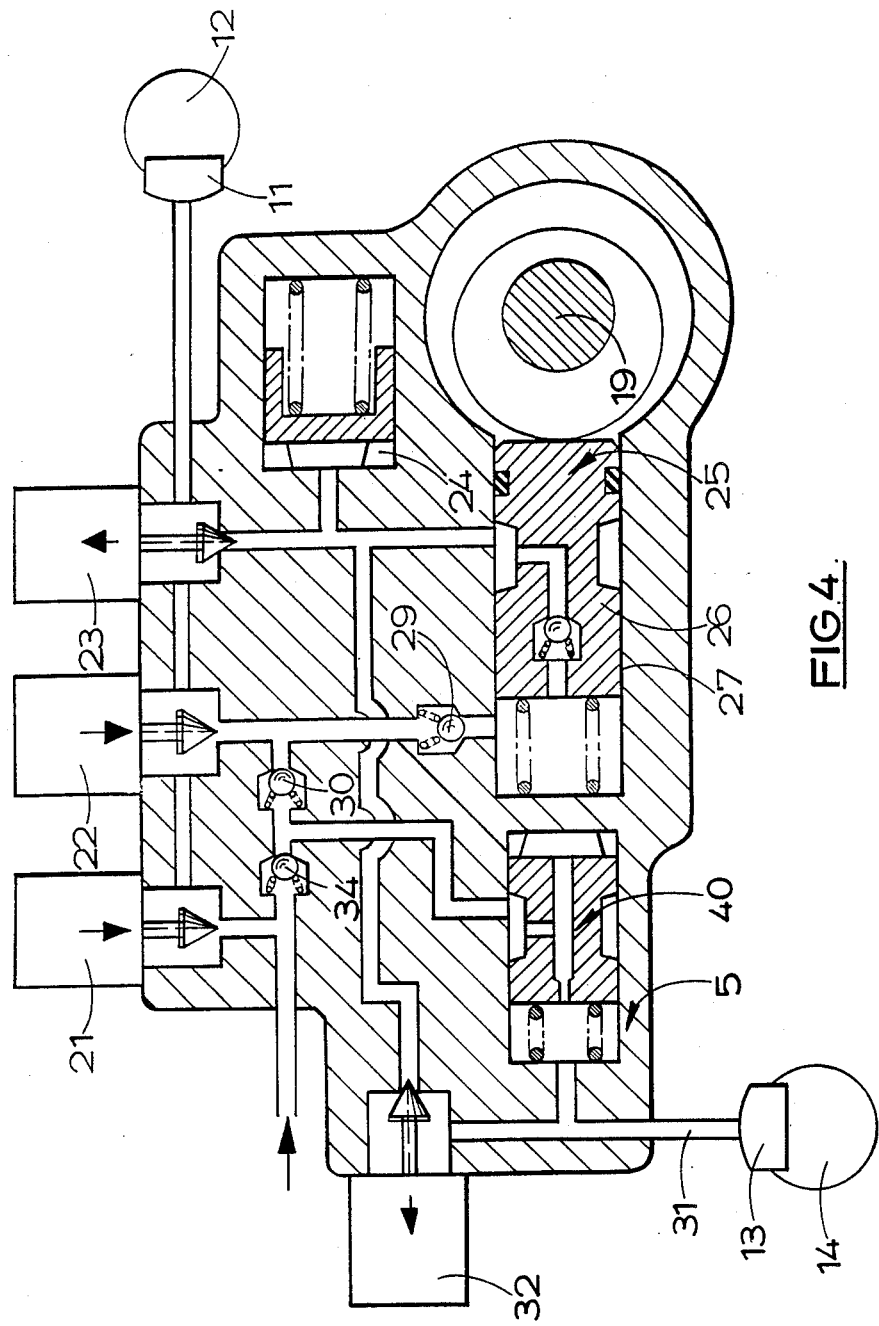
FIG. 4 is a section through a modulator similar to that of FIG. 3 but showing a modification.

In the modified construction illustrated in FIG. 4 of the drawings, the solenoid-operated valve 33 is replaced by a flow-control regulator valve 40 which acts, in a known manner, to control the rate of release of fluid from the brake 13 to the expansion chamber 24, and the rate of re-application of the brake 13 at the termination of an anti-lock cycle.

The construction and operation of the modulator assembly is otherwise the same as that of FIG. 3, and corresponding reference numerals have been applied to corresponding parts.

Figure 5:
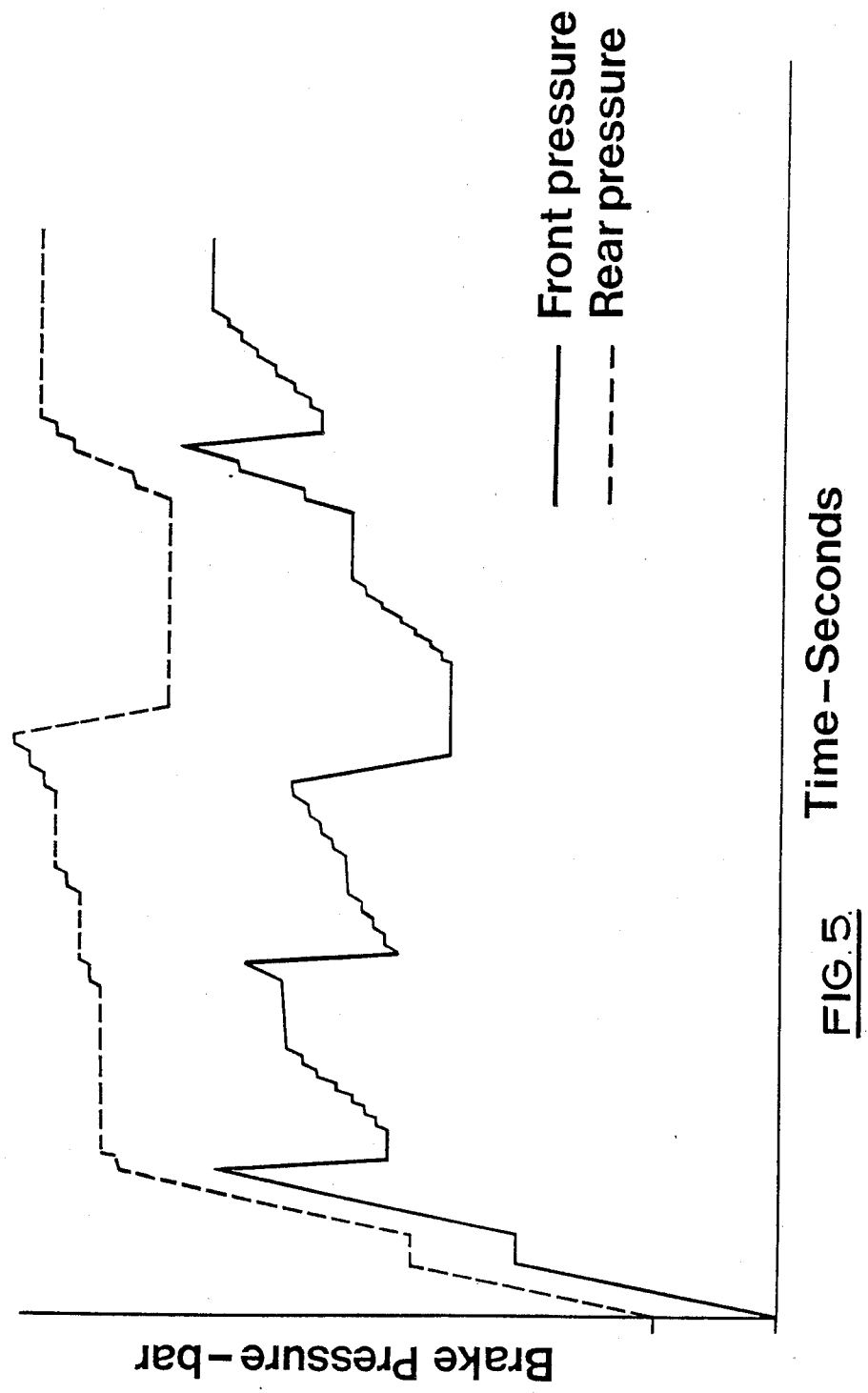
FIG. 5 is a graph showing a comparison between front wheel brake pressure and rear wheel brake pressure.

The relative braking effects of the front wheel brakes and the rear wheel brakes are illustrated in FIG. 5 of the drawings in which the front brake pressure is shown in full lines (———), and the rear brake pressure is shown in broken lines (-----).

Figure 6:
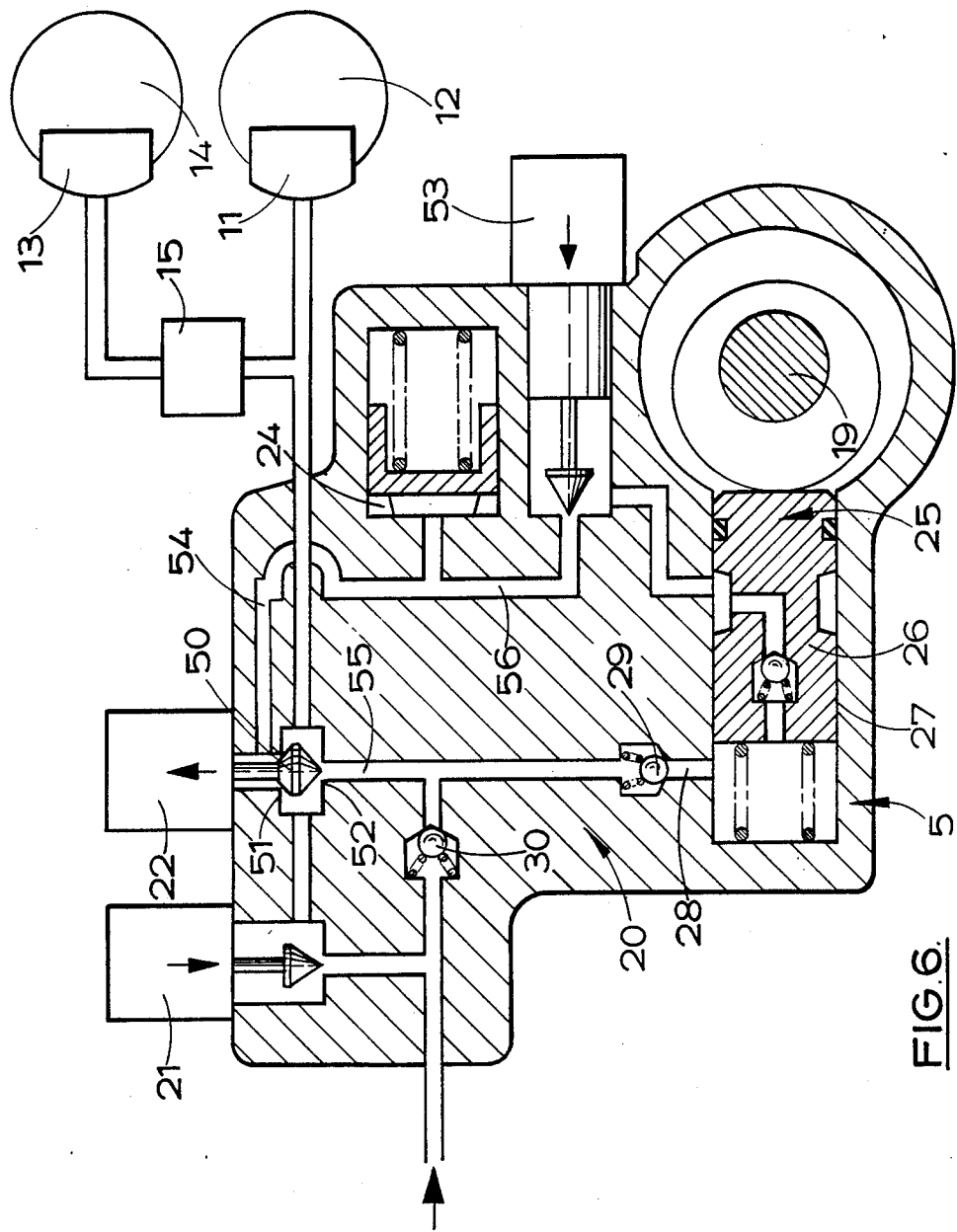
FIG. 6 is a longitudinal section similar to FIG. 2 but showing another modulator.

In the modulator assembly 5 illustrated in FIG. 6 of the accompanying drawings the re-application valve 22 is of the double acting type comprising a valve member 50 for alternate engagement with a pair of axially spaced seatings 51,52 to define a combined dump and re-application valve. The dump valve 23 is omitted, and the modulator assembly 5 is provided with a solenoid-operated hold valve 53.

The seating 51 surrounds a passage 54 leading to the expansion chamber 24, and the seating 52 surrounds a passage 55 on the downstream side of the one-way valve 30 leading to the master cylinder 1.

The hold valve 53 is disposed in a passage 56 through which fluid is withdrawn by the pump 25 from the expansion chamber 24.

In a normal brake applying position, the pump 25 is inoperative. The valve member 50 is in engagement with the seating 51 to isolate the brakes 11,13 from the expansion chamber 24, and both valves 21 and 53 are open. Fluid from the master cylinder 1 is therefore supplied to the brakes through the open valve 21.

If the speed sensor 17 emits an anti-lock signal the control module 18 causes the valve 21 to close, the valve member 50 to move away from the seating 51 and into engagement with the seating 52. The hold valve 53 remains open. Closure of the valve 21 isolates the master cylinder from the brakes 11,13, and the valve 22 is operative to connect the brakes 11,13 to the expansion chamber 24. The pump 25 draws fluid from the expansion chamber 24 and pumps it to the master cylinder 1. This continues for as long as the valve member 50 remains in engagement with the seating 52.

At the point at which the reduction in brake pressure permits wheel recovery, the valve member 50 moves away from the seating 52 and re-engages the seating 51. Thereafter the pump 25 returns fluid to the brakes 11,13 without adverse reaction at the foot pedal.

If the wheel does not recover quickly enough, the control module 18 is operative to cause the hold valve 53 to close. This isolates the pump 25 from the expansion chamber 24 to prevent an increase in the pressure applied to the brakes 11 and 13.

When the wheel recovers the valve 50 re-opens and the brakes are re-applied as described above.

The construction and operation of the modulator assembly of FIG. 6 is otherwise the same as that of FIG. 2, and corresponding reference numerals have been applied to corresponding parts.

Figure 7:
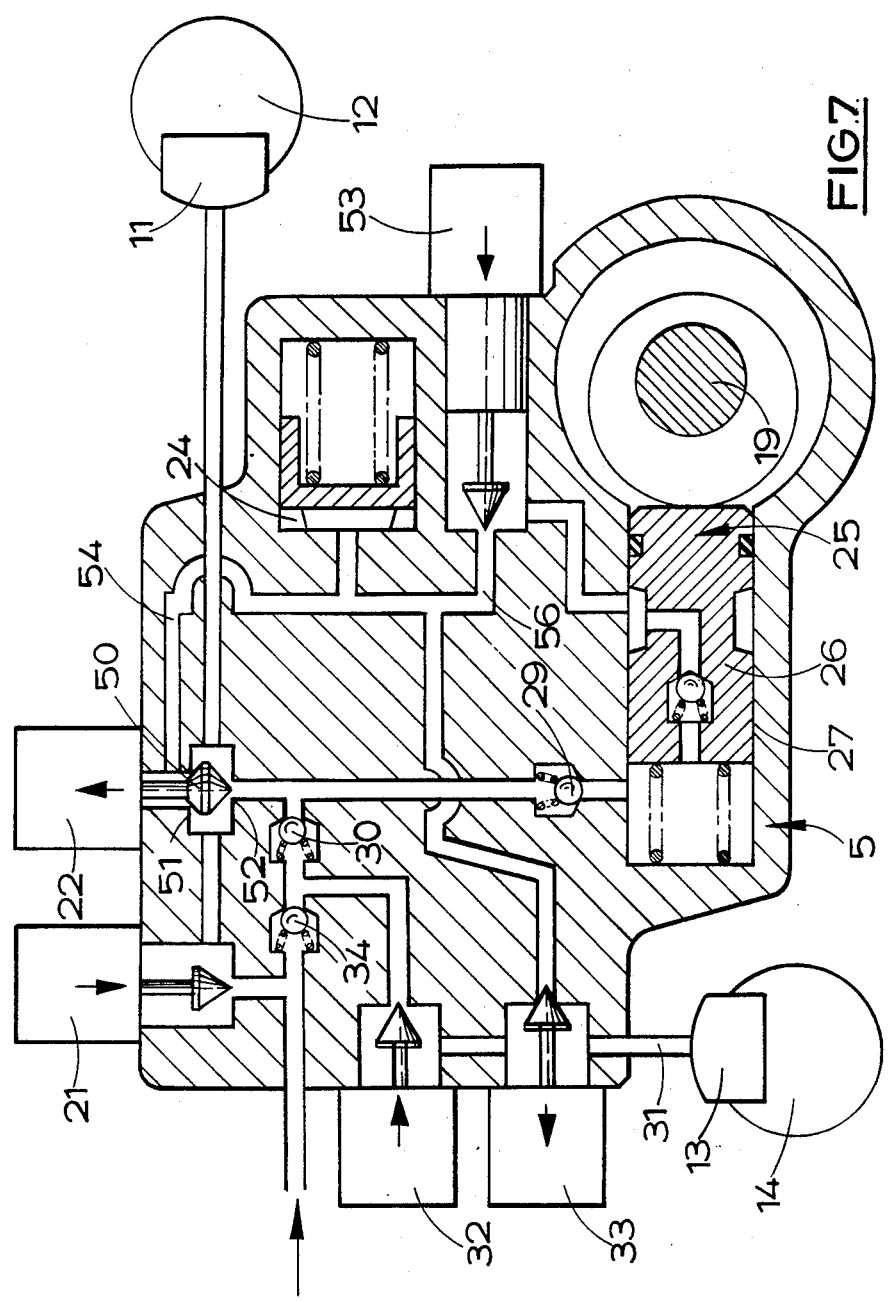
FIG. 7 is a longitudinal section through a modulator similar to the modulator of FIG. 6 but adapted for a braking system of the four channel type.

The modulator assembly illustrated in FIG. 7 of the accompanying drawings is similar to FIG. 6 but has been modified in a manner similar to FIG. 3 to control two separate channels.

As illustrated the modulator assembly 4 includes the two additional, interconnected, solenoid-operated valves 32 and 33 which, as before, control communication between the expansion chamber 24 and the connection 31, and between the master cylinder 1 and the brake 13, respectively.

The valves 32 and 33 operate in sequence and as described above with reference to FIG. 3, and the modulator assembly 5 is otherwise the same in construction and operation as the modulator assembly illustrated in FIG. 6. Corresponding reference numerals have therefore been applied to corresponding parts.

Figure 8:
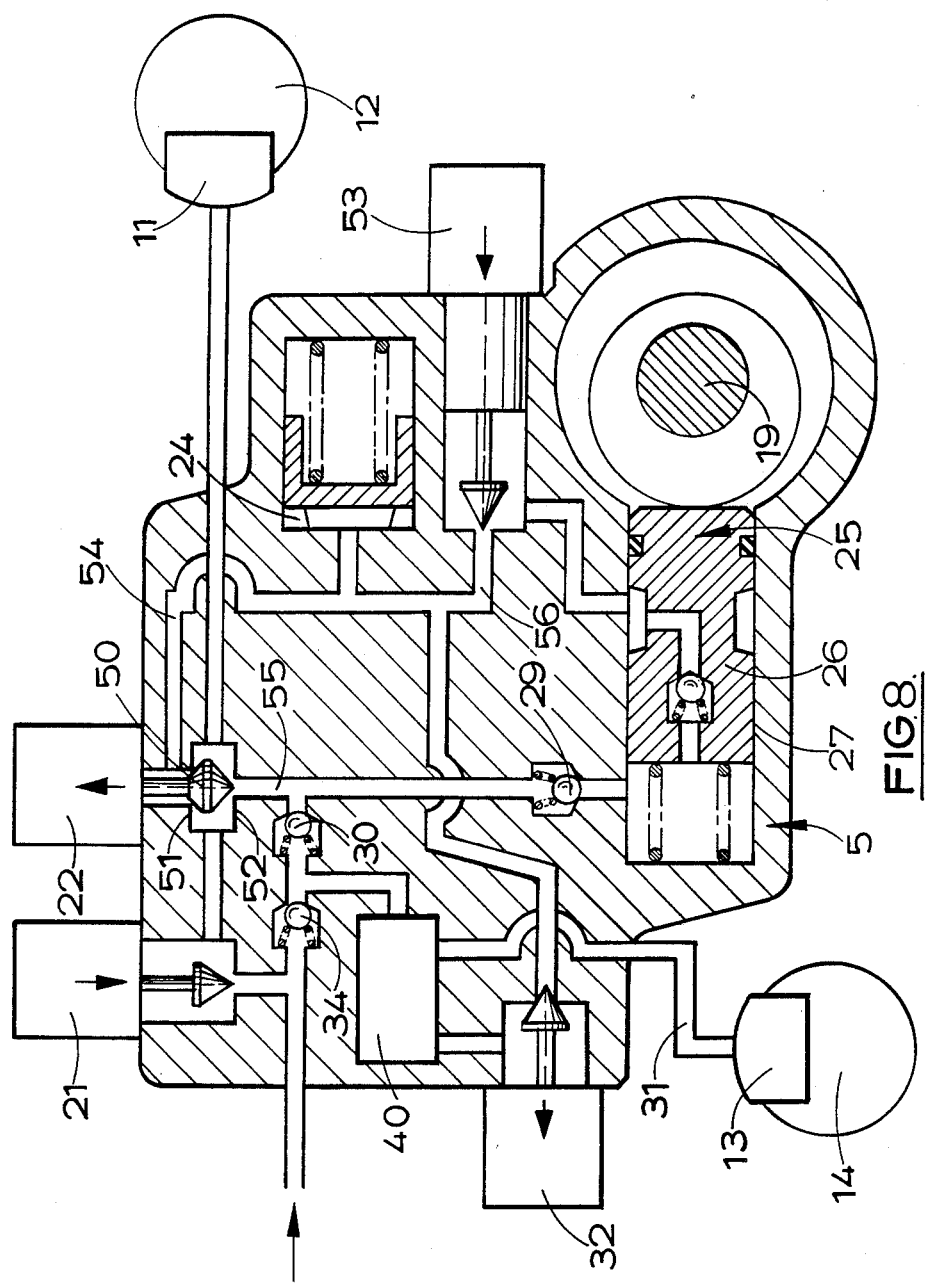
FIG. 8 is a section through a modulator similar to that of FIG. 7 but showing a modification.

In the modified construction illustrated in FIG. 8 of the accompanying drawings, as in the embodiment of FIG. 4, the solenoid-operated valve is replaced by the flow-control regulator valve 40.

The modulator assembly of FIG. 8 is otherwise the same as that of FIG. 7.

I claim:

1. An hydraulic anti-lock braking system for a vehicle comprising a brake on a wheel, an hydraulic master cylinder for supplying hydraulic fluid under pressure to said brake to apply said brake, a first passage between said master cylinder and said brake, sensor means responsive to the behaviour of said wheel, a control module responsive to signals from said sensor means, modulator means for modulating the supply of fluid from said master cylinder to said brake in accordance with signals from said control module, said modulator means comprising an expansion chamber to which fluid is dumped from said brake, a return passage from said brake to said expansion chamber and through which said fluid is adapted to be dumped, a pump having an output adapted to generate the energy necessary to recover fluid from said expansion chamber to re-apply said brake automatically after said pressure fluid applied to said brake has first been released to said expansion chamber through said return passage, said pump withdrawing from said expansion chamber the actual fluid dumped from said brake, a second passage between said pump and said master cylinder, a third passage between said pump and said brake, a valve assembly responsive to signals from said control module, wherein said valve assembly comprises an inlet valve disposed in said first passage for controlling communication between said master cylinder and said brake, a re-application valve disposed in said third passage for controlling communication between said output from said pump and said brake, and a dump valve disposed in said return passage for controlling communication between said brake and said expansion chamber, a one-way valve in said second passage to permit flow of fluid in a first direction from said pump to said master cylinder but to prevent flow in a second opposite direction, a first connection between said control module and said inlet valve, and a second connection between said control module and said re-application and dump valves, whereby said inlet valve, and said re-application and dump valves are operable independently in a predetermined sequence by said control module in accordance with the nature of a given signal from said sensor.

2. A braking system as claimed is claim 1, wherein a motor is adapted to drive said pump, said motor is operated in sequence with operation of said valve assembly, and said output from said pump is matched by a predetermined re-apply rate for a front wheel brake.

3. A braking system as claimed in claim 1, wherein said re-application valve and said dump valve are separate from each other, each said valve comprises a seat, and a valve member for co-operation with said respective seat.

4. A braking system as claimed in claim 1, wherein said re-application valve and the dump valve are combined into a single assembly comprising a pair of axially spaced seatings, and a double acting valve member for alternate engagement with said seatings.

5. A braking system as claimed in claim 4, wherein a hold valve is incorporated to isolate said pump from said expansion chamber, whereby to prevent the pressure applied to said brake from being increased.

6. A braking system as claimed in claim 1, wherein at least some of said valves are of the solenoid-operated type.

7. A braking system as claimed in claim 1, wherein at least one of said valves comprises a flow-control regulator valve, and said remaining valves are of the solenoid-operated type.

8. A braking system as claimed in claim 6, wherein each said valve of the solenoid-operated type has a coil, and each said coil is adapted to be energised by an energising current emitted by said electronic control module in response to signals from said wheel speed sensor.

9. An hydraulic anti-lock braking system for a four wheel vehicle having a first brake on a first front wheel, and a second brake on a second front wheel, said system comprising a tandem hydraulic master cylinder for applying said brakes and having first and second pressure spaces, a first connection between said first pressure space and said first brake, a second connection between said second pressure space and said second brake, first sensor means responsive to the behaviour of said first front wheel, second sensor means responsive to the behaviour of said second front wheel, a control module responsive to signals from both said sensor means, and modulator means for modulating the supply of pressure fluid from said master cylinder to said brakes in accordance with signals from said control module, said modulating means comprising a first modulator for modulating the supply of fluid from said first pressure space to said first brake, and a second modulator for modulating the supply of fluid from said second pressure space to said second brake, wherein each said first modulator and said second modulator comprises an expansion chamber to which fluid is dumped from said respective first and second brake, a pump having an output adapted to generate the energy necessary to recover fluid from said expansion chamber to re-apply said brake automatically after said pressure fluid applied to said brake has first been released to said expansion chamber, and a valve assembly responsive to signals from said control module, wherein said valve assembly comprises an inlet valve for controlling communication between said master cylinder and said brake, a re-application valve for controlling communication between said output from said pump and said brake, and a dump valve for controlling communication between said brake and said expansion chamber, said valves being operable in a predetermined sequence by said control module, whereby two similar modulators are provided for modulating the supply of fluid to both said front wheels.

10. A braking system as claimed in claim 9, wherein a first rear brake is provided on a first rear wheel of the vehicle, a second rear brake is provided on the other rear wheel of the vehicle, a first line is provided between said first modulator and said first rear brake, a second line is provided between said second modulator and said second rear brake, a first apportioning valve is located in said first line, and a second apportioning valve is located in said second line, whereby each said first and second rear brake is controlled in sequence with each said respective first and second front brake through said respective first and second apportioning valve.

11. A braking system as claimed in claim 9, wherein a first rear wheel brake is provided on a first rear wheel of the vehicle, a second rear wheel brake is provided on a second rear wheel of the vehicle, and each said first and second modulator further comprises fourth and fifth valves adapted to control communication between said respective pump and a respective one of said rear brakes, and between the said one rear brake and said respective expansion chamber.

12. An hydraulic anti-lock braking system for a vehicle comprising a brake on a wheel, an hydraulic master cylinder for supplying hydraulic fluid under pressure to said brake to apply said brake, sensor means responsive to the behaviour of said wheel, a control module responsive to signals from said sensor means, and modulator means for modulating the supply of pressure fluid from said master cylinder to said brake in accordance with signals from said control module, said modulating means comprising an expansion chamber to which fluid is dumped from said brake, a pump having an output adapted to generate the energy necessary to recover fluid from said expansion chamber to re-apply said brake automatically after said pressure fluid applied to said brake has first been released to said expansion chamber, and a valve assembly responsive to signals from said control module, wherein said valve assembly comprises an inlet valve for controlling communication between said master cylinder and said brake, a re-application valve for controlling communication between said output from said pump and said brake, and a dump valve for controlling communication between said brake and said expansion chamber, said valves being operable in a predetermined sequence by said control module, wherein said re-application valve and the dump valve are combined into a single assembly comprising a pair of axially spaced seatings, and a double acting valve member for alternate engagement with said seatings, and wherein a hold valve is incorporated to isolate said pump from said expansion chamber, whereby to prevent the pressure applied to said brake from being increased.

* * * * *